United States Patent
Ranganathan et al.

(10) Patent No.: US 9,405,718 B2
(45) Date of Patent: Aug. 2, 2016

(54) LEVERAGING AN ENUMERATION AND/OR CONFIGURATION MECHANISM OF ONE INTERCONNECT PROTOCOL FOR A DIFFERENT INTERCONNECT PROTOCOL

(71) Applicants: Sridharan Ranganathan, San Ramon, CA (US); Mahesh Wagh, Portland, OR (US)

(72) Inventors: Sridharan Ranganathan, San Ramon, CA (US); Mahesh Wagh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 461 days.

(21) Appl. No.: 13/976,548

(22) PCT Filed: Feb. 28, 2013

(86) PCT No.: PCT/US2013/028365
§ 371 (c)(1),
(2) Date: Jun. 27, 2013

(87) PCT Pub. No.: WO2014/133527
PCT Pub. Date: Sep. 4, 2014

(65) Prior Publication Data
US 2014/0289434 A1 Sep. 25, 2014

(51) Int. Cl.
*G06F 13/42* (2006.01)
*G06F 13/38* (2006.01)
*G06F 3/06* (2006.01)

(52) U.S. Cl.
CPC .............. *G06F 13/42* (2013.01); *G06F 3/0661* (2013.01); *G06F 13/387* (2013.01)

(58) Field of Classification Search
CPC .. G06F 13/4282; G06F 3/0661; G06F 13/387

USPC .......................................................... 710/315
See application file for complete search history.

(56) References Cited

U.S. PATENT DOCUMENTS

| | | | |
|---|---|---|---|
| 5,796,963 A * | 8/1998 | Odom ................. | G06F 13/4027 710/310 |
| 8,347,010 B1 | 1/2013 | Radovanovic | |
| 2006/0095607 A1* | 5/2006 | Lim .................... | G06F 13/4027 710/52 |
| 2008/0104303 A1 | 5/2008 | Jeansonne et al. | |
| 2008/0162750 A1 | 7/2008 | Sethi | |
| 2010/0146089 A1 | 6/2010 | Freimuth et al. | |
| 2012/0226835 A1 | 9/2012 | Thomas | |
| 2014/0089553 A1* | 3/2014 | Ma ..................... | G06F 13/4045 710/314 |
| 2014/0181349 A1* | 6/2014 | Balkan ............... | G06F 13/4027 710/310 |

OTHER PUBLICATIONS

PCT International Preliminary Report n Patentability and Written Opinion for PCT/US2013/028365 mailed Sep. 11, 2013 (8 pages).

(Continued)

*Primary Examiner* — Glenn A Auve
(74) *Attorney, Agent, or Firm* — Blakely, Sokoloff, Taylor & Zafman LLP

(57) ABSTRACT

An interconnect architecture device of an aspect includes a processor to generate a transaction that is of a different interconnect protocol than LLI. The interconnect architecture device also includes conversion logic coupled with the processor. The conversion logic is to convert the transaction, which is of the different interconnect protocol than LLI, to an LLI packet. The interconnect architecture device also includes an LLI controller coupled with the conversion logic. The LLI controller is to couple the interconnect architecture device with an LLI link. The LLI controller is to transmit the LLI packet on the LLI link.

22 Claims, 9 Drawing Sheets

(56) References Cited

OTHER PUBLICATIONS

"Notification of Transmittal of the International Search Report and the Written Opinion of the International Searching Authority, or the Declaration" mailed Dec. 26, 2013 pages, 11, in PCT/US2013/028365.

MIPI Alliance Specification for LLI, Version 1.0, Jan. 26, 2012, pp. 11-44.

* cited by examiner

FIG. 2

METHOD IN LLI
MASTER DEVICE
230

GENERATE TRANSACTION THAT IS OF DIFFERENT INTERCONNECT PROTOCOL THAN LLI WITHIN LLI MASTER DEVICE — 231

CONVERT TRANSACTION, WHICH IS OF DIFFERENT INTERCONNECT PROTOCOL THAN LLI, TO LLI PACKET — 232

TRANSMIT MIPI SYMBOLS CORRESPONDING TO LLI PACKET ON LLI LINK — 233

FIG. 3

METHOD IN LLI
SLAVE DEVICE
335

RECEIVE MIPI SYMBOL ON LLI LINK OF LLI SLAVE DEVICE — 336

CONVERT LLI PACKET CORRESPONDING TO MIPI SYMBOL TO TRANSACTION THAT IS OF DIFFERENT INTERCONNECT PROTOCOL THAN LLI — 337

SERVICE TRANSACTION THAT IS OF DIFFERENT INTERCONNECT PROTOCOL THAN LLI — 338

LEVERAGING AN ENUMERATION AND/OR CONFIGURATION MECHANISM OF ONE INTERCONNECT PROTOCOL FOR A DIFFERENT INTERCONNECT PROTOCOL

CROSS-REFERENCE TO RELATED APPLICATION

This patent application is a U.S. National Phase Application under 35 U.S.C. §371 of International Application No. PCT/US2013/028365, filed Feb. 28, 2013, entitled LEVERAGING AN ENUMERATION AND/OR CONFIGURATION MECHANISM OF ONE INTERCONNECT PROTOCOL FOR A DIFFERENT INTERCONNECT PROTOCOL.

BACKGROUND

Technical Field

Embodiments described herein generally relate to interconnects. In particular, embodiments described herein generally relate to enumeration and/or configuration of devices attached to interconnects.

BRIEF DESCRIPTION OF THE DRAWINGS

The invention may best be understood by referring to the following description and accompanying drawings that are used to illustrate embodiments of the invention. In the drawings:

FIG. 2 is a block flow diagram of an embodiment of a method that may be performed by an LLI master device.

FIG. 3 is a block flow diagram of an embodiment of a method that may be performed by an LLI slave device.

DETAILED DESCRIPTION OF EMBODIMENTS

Disclosed herein are methods, apparatus, and systems to leverage an enumeration and/or configuration mechanism of one interconnect protocol for another different interconnect protocol. In the following description, numerous specific details are set forth (e.g., specific interconnect protocols, types of transactions, types of transaction conversions, logic implementations, logic partitioning/integration details, sequences of operations, types and interrelationships of system components, and the like). However, it is understood that embodiments of the invention may be practiced without these specific details. In other instances, well-known circuits, structures and techniques have not been shown in detail in order not to obscure the understanding of this description.

The Mobile Industry Processor Interface (MIPI®) Alliance is an open membership organization having an objective of defining and promoting open specifications for interfaces inside mobile terminals. A Low Latency Interface (LLI) Working Group of MIPI has produced the MIPI® Alliance Specification for Low Latency Interface (LLI). For simplicity, this specification will also be referred to herein as MIPI LLI or simply LLI.

LLI is a low-latency interface designed to connect devices (e.g., of a mobile device or terminal) at the interconnect level (e.g., through Open Core Protocol (OCP), Advanced Microcontroller Bus Architecture (AMBA®), etc.) using memory-mapped transactions. An LLI link is a bidirectional interface that allows either device to initiate transactions. LLI is a point-to-point interconnect that allows devices on separate chips to communicate as if a device on the remote chip resides on the local chip. The LLI specification is expressed as a layered, transaction level protocol in which targets and initiators on chips linked by LLI are able to exchange transactions substantially without software intervention, which helps to achieve low latency. LLI also generally exhibits low power consumption, which tends to make LLI well suited for cellular phones, tablets, and other mobile battery-powered devices. One limitation with LLI is that it currently does not have a sufficient mechanism to enumerate and configure devices that are attached to LLI links.

Figure 1:
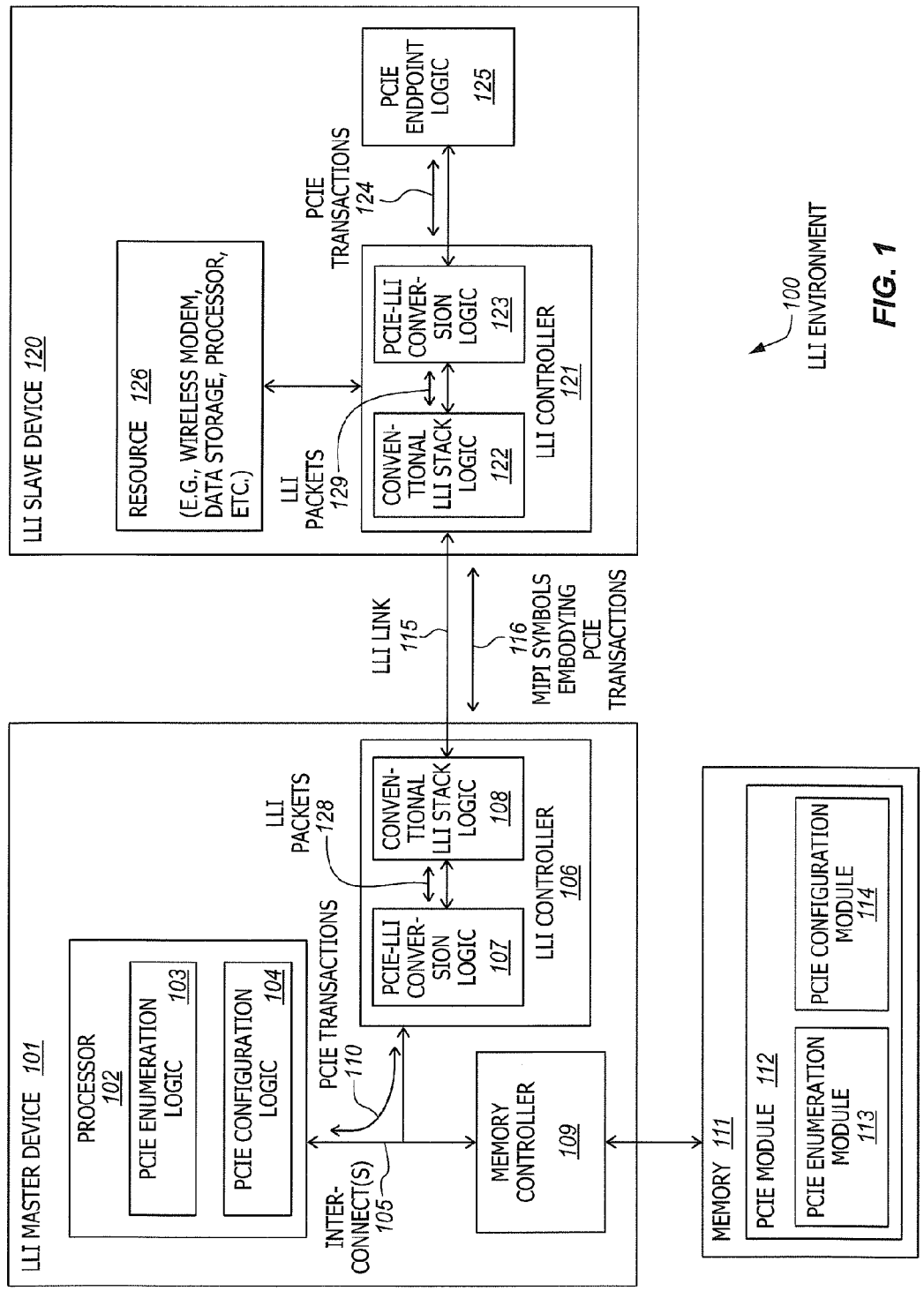
FIG. 1 is a block diagram of an embodiment of an LLI environment that includes an embodiment of an LLI master device coupled to an embodiment of an LLI slave device by an LLI link.

FIG. 1 is a block diagram of an embodiment of an LLI environment 100 that includes an embodiment of an LLI master device 101 coupled to an embodiment of an LLI slave device 120 by an LLI link 115. The terms "master" and "slave" are used for consistency with the LLI specification. The master device may also represent a host device or simply a first device, and the slave device may also represent a hosted device or simply a second device. The LLI master device may be operable to control the LLI slave device. In some embodiments, the LLI master and slave devices may be different chips, die, integrated circuits, or potentially different packages.

Examples of suitable LLI master devices include, but are not limited to, application processor chips and application processor systems on chips (SoCs). Examples of suitable LLI slave devices include, but are not limited to, coprocessor chips, wireless modem chips (e.g., cellular modem chips, wireless local area network (WLAN) modem chips, etc.), and data storage chips (e.g., flash memory chips), to name a few examples. As shown, the LLI slave device may have a wireless modem, data storage device, coprocessor, or other resource 126 that is used by the LLI master device. Components on the LLI master and slave devices may be memory-mapped to facilitate device addressing. The LLI master device may be operable to manage the overall system memory map.

The LLI master device includes a processor 102, an LLI controller 106, and a memory controller 109. The processor, the LLI controller, and the memory controller are all coupled with one another, or otherwise in communication with one another, by one or more buses or other interconnects 105. The memory controller is coupled with or connected to a memory 111. The LLI controller 106 is coupled with or connected to one end of the LLI link 115. The LLI controller is operable to couple the master device with the LLI link. The LLI slave device 120 also includes an LLI controller 121 that is coupled with or connected to another end of the LLI link 115.

In some embodiments, an enumeration and/or configuration mechanism of a first interconnect protocol may be leveraged or reused for a second, different interconnect protocol. In one aspect, the second interconnect protocol may not natively have an enumeration and/or configuration mechanism. In another aspect, the second interconnect protocol may have an enumeration and/or configuration mechanism but it may not be as good, extensive, comprehensive, well developed, well tested, flexible, or fast as that of the first interconnect protocol. In yet another aspect, the second interconnect protocol may have an enumeration and/or configuration mechanism but for some other reason it may be desirable to use the enumeration and/or configuration mechanism of the first interconnect protocol (e.g., because it has a feature not present in the other, because of familiarity or preference, etc.).

As will be described further below, in some embodiments, an enumeration and/or configuration mechanism of Peripheral Component Interconnect (PCI), Peripheral Component Interconnect Express (PCIE), or Peripheral Component Interconnect eXtended (PCI-X), may be leveraged and/or reused for MIPI LLI, although the scope of the invention is not so limited. In other embodiments, an enumeration and/or configuration mechanism of another internet protocol besides PCI, PCIE, or PCI-X may be leveraged or reused for LLI, such as, for example, a future version of PCI, PCIE, or PCI-X, a derivative of PCI, PCIE, or PCI-X, a protocol related to PCI, PCIE, or PCI-X, a protocol similar to PCI, PCIE, or PCI-X, a replacement of PCI, PCIE, or PCI-X, or a protocol having comparable enumeration and/or configuration capabilities to PCI, PCIE, or PCI-X. Alternatively, other protocols with enumeration and/or configuration capabilities, such as, for example, Universal Serial Bus (USB) protocols, other protocols derived from or related to USB, or other future developed protocols, may optionally be used. As used herein, the terms "Peripheral Component Interconnect based protocol," "PCI based protocol," and the like, refer collectively to PCI, PCIE, PCI-X, and other protocols based on or derived from PCI. In still other embodiments, an enumeration and/or configuration mechanism of PCI, PCI-X, PCIE, or some other interconnect protocol, may be leveraged or reused for an interconnect protocol other than LLI (e.g., a future version or derivative of LLI or another interconnect protocol having limited enumeration and/or configuration capabilities). In other embodiments, instead of LLI, Unified Protocol (Unipro), digRF, SuperSpeed Inter-Chip (SSIC), or others may be used. In the embodiments herein, PCIE is often used as an exemplary protocol, although it is to be appreciated that PCIE may alternatively be replaced with PCI or PCI-X or USB, or another suitable interconnect protocol having an enumeration and configuration mechanism. Moreover, in the embodiments below, LLI is often used as an exemplary protocol, although it is to be appreciated that LLI may alternatively be replaced with a future version of LLI, a derivative of LLI, a protocol related to LLI, a protocol similar to LLI, or another interconnect protocol that can benefit from leveraging and/or reusing the enumeration and configuration capabilities of another, different interconnect protocol.

Referring again to FIG. 1, the memory 111 has a PCIE module 112. Alternatively, the memory may have a module of another interconnect protocol that is different than LLI (e.g., PCI, PCI-X, PCI based protocol, USB, etc.). In some embodiments, the PCIE module may be operable to control communication over a PCIE bus. The PCIE bus is not shown, and there may not actually be a PCIE bus, as will be explained further below. By way of example, the PCIE module may include a PCIE bus driver, a PCIE software stack, or a similar functionality. In some embodiments, the PCIE module may include a substantially conventional PCIE bus driver, PCIE software stack, or at least a portion therein sufficient to perform enumeration and/or configuration as described herein. Various of the major operating systems commonly include conventional PCIE bus drivers and/or PCIE software stacks that are suitable for embodiments.

Conventional PCIE bus drivers and/or PCIE software stacks generally have a mechanism to enumerate and configure devices that are attached to PCIE buses. The illustrated PCIE module has a PCIE enumeration module 113 that is useful for PCIE enumeration to enumerate one or more LLI slave devices to the LLI master device. By way of example, the PCIE enumeration module may include instructions, code, routines, or procedures that allow the processor to discover or detect devices attached to PCIE buses, discover or detect the capabilities of devices attached to PCIE buses, discover or detect the resources that the devices attached to PCIE buses will use (e.g., how much memory the devices will use), types and numbers of interrupters supported, the type and number of functions in each device, and the like. The illustrated PCIE module also has a PCIE configuration module 114 that is useful for PCIE configuration. By way of example, the PCIE configuration module may include instructions, code, routines, or procedures that allow the processor to configure devices attached to PCIE buses, for example, by configuring memory address ranges, configuring interrupt vectors, modifying PCIE configuration registers and/or capability structures, etc. While separate PCIE enumeration and configuration modules have been shown, other embodiments may combine these modules into a single module. In other embodiments, a PCIE enumeration module may be included without a PCIE configuration module, or a PCIE configuration module may be included without a PCIE enumeration module.

In some embodiments, the PCIE enumeration 113 and configuration modules 114 may be substantially conventional, and may be useful to perform substantially conventional enumeration and configuration. In some embodiments, the LLI master device 101 may leverage or reuse the substantially conventional PCIE enumeration and/or configuration modules to perform enumeration and/or configuration of the LLI slave device 120 over the LLI link 115. In some embodiments, this may help to avoid needing to develop new enumeration and/or configuration mechanisms specifically for LLI, which may help to avoid or at least reduce development times and costs. In addition, the PCIE enumeration and configuration modules tend to be well developed, tested, and understood. Moreover, they are already widely available through several major operating systems. In addition, PCIE employs standardized enumeration and configuration mechanisms. The use of such standardized mechanisms may help to avoid the development of custom and/or proprietary enumeration and/or configuration mechanisms which may tend to reduce device interoperability.

Referring again to FIG. 1, the processor 102 may execute instructions of the PCIE enumeration module 113 and/or the PCIE configuration module 114 (e.g., as a portion of the operating system executed on the processor), which may configure the processor to have a PCIE enumeration module/mechanism/logic 103 and/or PCIE configuration module/mechanism/logic 104, respectively. In some embodiments, this may cause the processor to generate and provide a PCIE or PCI based transaction 110. That is, the processor may generate and provide a transaction that is of a different interconnect protocol than LLI. The PCIE enumeration module/mechanism/logic and/or the PCIE configuration module/ mechanism/logic may provide the PCIE or PCI based transactions 110 to the LLI controller 106 of the LLI master device over the one or more interconnects 105.

The LLI controller includes an embodiment of PCIE-LLI conversion logic 107 that is coupled with the processor 102. In another embodiment the PCIE-LLI conversion logic 107 may be separate from the LLI controller 106 but coupled with the LLI controller 106 (e.g., coupled or logically disposed between the LLI controller and the processor). The PCIE-LLI conversion logic 107 may receive the PCIE transactions 110. In some embodiments, the PCIE-LLI conversion logic 107 may be operable to perform PCIE-to-LLI conversions and LLI-to-PCIE conversions. Alternatively, PCI-LLI conversion logic may be included to convert between PCI (or other PCI based protocol) and LLI, or other logic may be included to convert between LLI and another interconnect protocol besides LLI. The PCIE-LLI conversion logic 107 may be operable to convert the received PCIE transactions 110 to corresponding LLI transactions, packets, or LLI compliant data formats 128, which embody or represent the PCIE transactions 110. In some embodiments, the conversion may involve mapping bits or fields of the PCIE transactions to corresponding bits or fields of LLI packets or LLI compliant data formats. Specific examples of how this may be done will be described further below. The PCIE-LLI conversion logic may then provide the LLI packets or other LLI compliant data formats 128 to coupled LLI stack logic 108. In some embodiments, the LLI stack logic may optionally represent a substantially conventional LLI stack that includes a transaction layer, a data link layer, a PHY adapter layer, and one or more M-PHY(s). In some embodiments, the PCIE-LLI conversion logic may be operable to provide the LLI transactions that it generates to the transaction layer of the LLI stack logic 108. The LLI stack logic may convert the received LLI packets to corresponding MIPI symbols and then the M-PHY(s) of the LLI stack logic 108 and/or the LLI controller 106 may transmit the MIPI symbols 116 (derived from the LLI packets 128), which embody or represent the PCIE transactions 110, over the LLI link 115. Accordingly, in some embodiments, the PCIE transactions used for enumeration and/or configuration may be conveyed over the LLI link as MIPI symbols that have been derived from LLI packets.

The LLI slave device 120 includes an LLI controller 121. The LLI controller is coupled with another opposite end of the LLI link 115 and is operable to couple the LLI slave device with the LLI link. The LLI controller 121 includes an LLI stack logic 122. In some embodiments, the LLI stack logic 122 may optionally represent a substantially conventional LLI stack that includes a transaction layer, a data link layer, a PHY adapter layer, and one or more M-PHY(s). The M-PHY (s) of the LLI stack logic 122 may receive the MIPI symbols (derived from the LLI packets 128), which embody or represent the PCIE transactions 110, from the LLI link 115. The LLI stack logic 122 may process the MIPI symbols and generate LLI transactions, packets, or other LLI compliant data formats 129. A transaction layer of the LLI stack logic 122 may provide the LLI transactions or packets 129 to an embodiment of PCIE-LLI conversion logic 123. Alternatively, the LLI transactions or packets may be provided to PCI-LLI conversion logic, or logic to convert between LLI and another interconnect protocol besides LLI other than PCI and PCIE.

In the illustration the PCIE-LLI conversion logic 123 is part of the LLI controller 121. In another embodiment the PCIE-LLI conversion logic 123 may be separate from the LLI controller 121, but coupled with the LLI controller 121 (e.g., coupled or logically disposed between the LLI controller and an embodiment of PCIE endpoint logic 125). The PCIE-LLI conversion logic 123 is operable to perform PCIE-to-LLI conversions and LLI-to-PCIE conversions. Alternatively, other PCI based conversions, or other conversions may be performed as described elsewhere herein. The PCIE-LLI conversion logic may convert the received LLI transactions or packets 129, which embody or represent the PCIE transactions 110, to corresponding PCIE transactions 124. In some embodiments, the conversion may involve mapping bits or fields of LLI packets to appropriate corresponding bits or fields of PCIE transactions. Specific examples of such conversions will be discussed further below.

The PCIE-LLI conversion logic 123 is coupled with an embodiment of PCIE endpoint logic 125. Alternatively, rather than PCIE endpoint logic, PCI endpoint logic may be used, or endpoint logic of another interconnect protocol besides LLI, PCI, and PCIE may be used. The PCIE-LLI conversion logic 123 may provide the PCIE transactions 124 it generates to the PCIE endpoint logic 125. In some embodiments, the PCIE transactions 124 provided to the PCIE endpoint logic may be identical, or at least substantially identical, to the PCIE transactions 110 initially provided from the processor 101 (e.g., bits in fields of a packet of the PCIE transaction 124 may be identical to bits in fields of a packet of the PCIE transaction 110). In some embodiments, the PCIE endpoint logic may have as much PCIE logic as would a normal PCIE device attached to a PCIE bus. Alternatively, the PCIE endpoint logic may at least have as much PCIE logic as needed to support the desired enumeration and/or configuration desired for the particular embodiment. By way of example, in some embodiments, the PCIE endpoint logic may include PCIE (or other PCI based) compatible configuration registers (e.g., PCIE base address registers, etc.) and capability structures that may be configured using embodiments described herein. As another example, in some embodiments, the PCIE endpoint logic may include logic to service/implement memory mapped transactions and/or logic to service/implement PCIE configuration transactions. In some embodiments, the PCIE endpoint logic may be included in the LLI slave device even though the LLI slave device need not necessarily have a PCIE bus and/or the PCIE endpoint logic need not necessarily be coupled with a PCIE bus.

In some embodiments, the PCIE endpoint logic may represent PCIE root-complex integrated endpoint logic. In PCIE the host device is also sometimes referred to in the art as a root-complex integrated device. The remote device is sometimes referred to as an endpoint or root-complex endpoint. Historically in PCI, the host device and the remote device were different chips attached to a printed circuit board. PCIE also allows the endpoint device to be integrated on-chip or on-die with the root-complex device instead of being on a separate remote chip. Such an integrated device is also sometimes referred to in the art as a root-complex integrated endpoint device. The root-complex device and the root-complex integrated endpoint device are integrated together on-chip or on-die. In the case of PCIE root-complex integrated endpoint logic, the processor of the master device may not even need to know or be aware of the intervening LLI link, but rather may communicate with the root-complex integrated endpoint device as if it were integrated on-chip or on-die with the processor.

In some embodiments, the PCIE transactions 110 and/or the PCIE transactions 124 may be used to enumerate and/or configure the LLI slave device 120. In the case of configuration, the PCIE transactions 124 may be operable to modify PCIE-based (or other PCI based) configuration registers and/ or capability structures of the slave device. In some embodiments, for example in the case of some enumeration, the PCIE transactions 124 may cause or result in the PCIE endpoint logic generating responsive PCIE transactions 124 in the reverse direction that are to be transmitted toward the LLI master device. These PCIE transactions 124 may be provided to the LLI controller 121 of the slave device, be transmitted by the LLI stack logic as MIPI symbols over the LLI link 115, be received as MIPI symbols by the LLI stack of the LLI controller 106 of the master device, effectively traversing in the reverse direction to that previously described. The PCIE-LLI conversion logic 123 of the slave device may convert the PCIE packets or transactions 124 to corresponding LLI packets. MIPI symbols 116, which embody or represent the PCIE transactions 124, may be conveyed over the LLI link. The PCIE-LLI conversion logic 107 of the master device may convert LLI packets recovered from these MIPI symbols received over the LLI link to corresponding PCIE transactions 110. These PCIE transactions 110 may be identical, or at least substantially identical (e.g., functionally equivalent to), to the originally sent PCIE transactions 124.

FIG. 2 is a block flow diagram of an embodiment of a method 230 that may be performed by an LLI master device. In some embodiments, the operations and/or method of FIG. 2 may be performed by and/or within the LLI master device 101 of FIG. 1. The components, features, and specific optional details described herein for the LLI master device 101 also optionally apply to the operations and/or method 230, which may in embodiments be performed by and/or within the LLI master device 101. Alternatively, the operations and/or method of FIG. 2 may be performed by and/or within a similar or entirely different LLI master device than that of FIG. 1. Moreover, the LLI master device of FIG. 1 may perform operations and/or methods the same as, similar to, or entirely different than those of FIG. 2.

The method includes generating a transaction, which is of a different interconnect protocol than LLI, within the LLI master device, at block 231. In some embodiments, the transaction may be of a PCI protocol, a PCIE protocol, another PCI based protocol, or another protocol that is different from LLI. In some embodiments, the transaction may be part of at least one of an enumeration of an LLI slave device coupled with an LLI link and a configuration of the LLI slave device coupled with the LLI link.

The method includes converting the transaction, which is of the different interconnect protocol than LLI, to an LLI packet or transaction, at block 232. In some embodiments, the LLI packet may embody or represent the generated PCI based transaction. In some embodiments, the conversion may involve mapping bits or fields of the generated PCI based transaction to corresponding bits or fields of LLI packet. In some embodiments, the LLI packet may be provided to a transaction layer of an optionally conventional LLI stack.

The method also includes transmitting MIPI symbols derived from the LLI packet on the LLI link, at block 233. In some embodiments, the MIPI symbols may embody or represent, and may be used to convey, the originally generated PCI based transaction or other transaction that is of the different interconnect protocol than LLI.

FIG. 3 is a block flow diagram of an embodiment of a method 335 that may be performed by an LLI slave device. In some embodiments, the operations and/or method of FIG. 3 may be performed by and/or within the LLI slave device 120 of FIG. 1. The components, features, and specific optional details described herein for the LLI slave device 120 also optionally apply to the operations and/or method 335, which may in embodiments be performed by and/or within the LLI slave device 120. Alternatively, the operations and/or method of FIG. 3 may be performed by and/or within a similar or entirely different LLI slave device than that of FIG. 1. Moreover, the LLI slave device of FIG. 1 may perform operations and/or methods the same as, similar to, or entirely different than those of FIG. 2.

The method includes receiving an MIPI symbol, which has been derived from an LLI packet, on an LLI link of the LLI slave device, at block 336. In some embodiments, the received MIPI symbol may embody or represent, and may be used to convey, a transaction that is of a PCI based protocol or other different interconnect protocol than LLI.

The method includes converting an LLI packet, which corresponds to and/or is derived from the received MIPI symbol, to the transaction that is of the different interconnect protocol than LLI, at block 337. In some embodiments, the LLI packet may be converted to a transaction of a PCI protocol, a PCIE protocol, or another protocol that is different than LLI. In some embodiments, the conversion may involve mapping bits or fields of the LLI packet to corresponding bits or fields of the transaction.

The method includes servicing the transaction, which is of the different interconnect protocol than the LLI, at block 338. In some embodiments, the transaction may be serviced with one of a PCI endpoint logic and PCIE endpoint logic. In some embodiments, servicing the transaction may be performed in conjunction with at least one of configuring the LLI slave device and enumerating the LLI slave device to an LLI master device.

FIGS. 2-3 illustrate methods in which the master device generates transactions and transmits symbols representing those transactions to the slave device. Alternatively, as previously mentioned, analogous reverse methods are also contemplated in which the slave device generates transactions and transmits symbols representing those transactions to the master device. In some embodiments, this may be done substantially as described above for FIG. 1.

Figure 4:
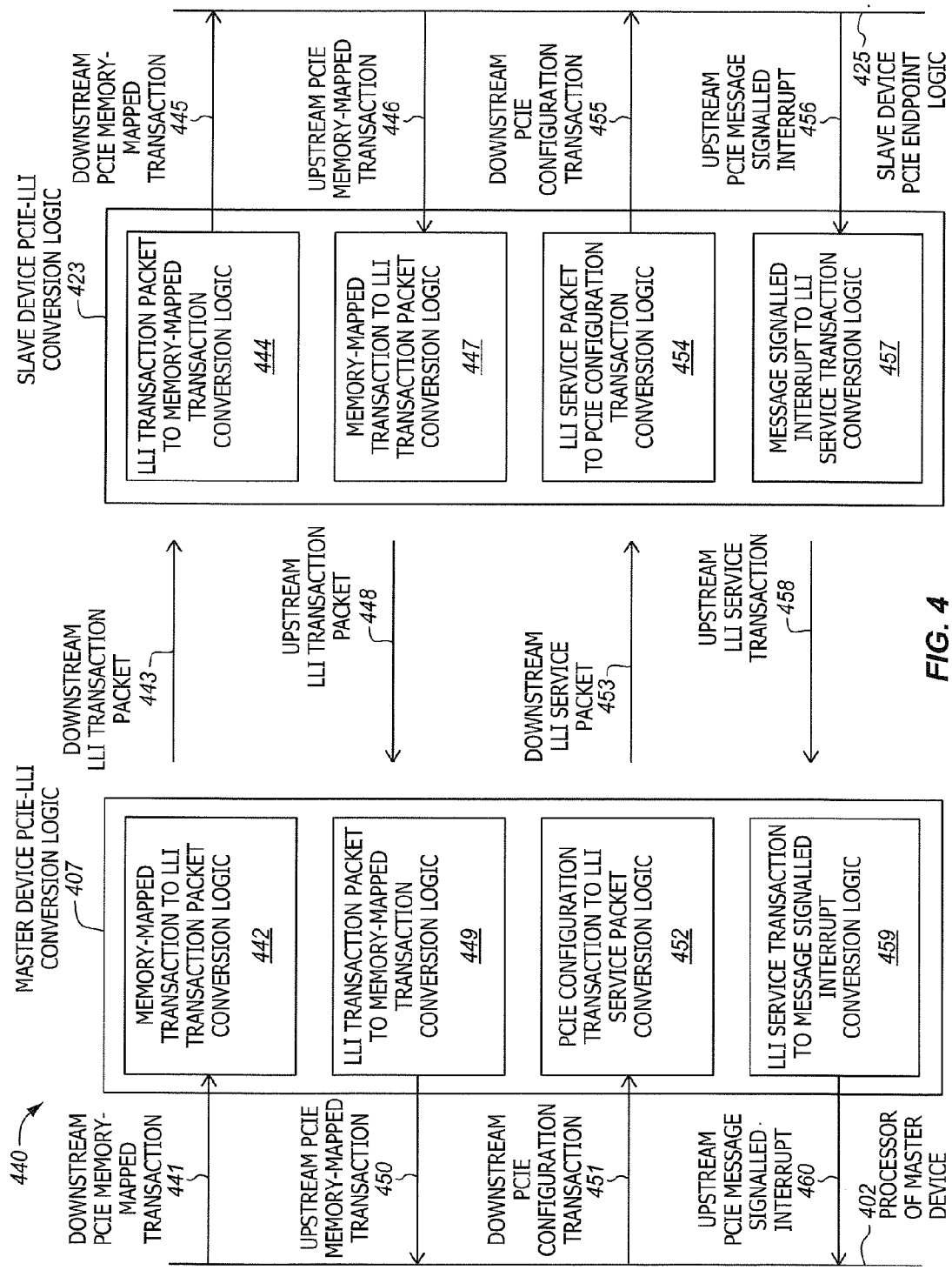
FIG. 4 is a block diagram illustrating example embodiments of suitable PCIE-LLI conversions.

FIG. 4 is a block diagram illustrating example embodiments of suitable PCIE-LLI conversions 440. An embodiment of a master device PCIE-LLI conversion logic 407 and an embodiment of a slave device PCIE-LLI conversion logic 423 are shown. In some embodiments, the master PCIE-LLI conversion logic 407 and/or the slave PCIE-LLI conversion logic 423 of FIG. 4, respectively, may be included in the LLI master device 101 and/or the LLI slave device 120 of FIG. 1. Alternatively, the master PCIE-LLI conversion logic 407 and/or the slave PCIE-LLI conversion logic 423 of FIG. 4, respectively, may be included in similar or different LLI master and slave devices than those of FIG. 1. Moreover, the LLI master device 101 and/or the slave device 120 of FIG. 1 may have similar or different PCIE-LLI conversion logic than those of FIG. 4.

A master device processor 402 may transmit a downstream memory-mapped transaction 441 toward a memory mapped transaction to LLI transaction packet conversion logic 442 of the master device PCIE-LLI conversion logic. The term "downstream" is used herein to refer to a direction from a master device to a slave device. In contrast, the term "upstream" is used herein to refer to a direction from the slave device to the master device. The conversion logic 442 may be operable to convert the downstream memory-mapped transaction 441 to a corresponding downstream LLI transaction packet 443. The downstream LLI transaction packet 443 may be transmitted toward the slave device PCIE-LLI conversion logic 423.

An LLI transaction packet to memory mapped transaction conversion logic 444 of the slave device PCIE-LLI conversion logic may receive the downstream LLI transaction packet 443. The conversion logic 444 may be operable to convert the downstream LLI transaction packet 443 to a corresponding downstream memory mapped transaction 445. The downstream memory mapped transaction 445 may be transmitted toward a slave device PCIE endpoint logic 425.

The slave device PCIE endpoint logic 425 may transmit an upstream memory-mapped transaction 446 toward a memory mapped transaction to LLI transaction packet conversion logic 447 of the slave device PCIE-LLI conversion logic. The conversion logic 447 may be operable to convert the upstream memory-mapped transaction 446 to a corresponding upstream LLI transaction packet 448. The upstream LLI transaction packet 448 may be transmitted toward the master device PCIE-LLI conversion logic.

An LLI transaction packet to memory mapped transaction conversion logic 449 of the master device PCIE-LLI conversion logic may receive the upstream LLI transaction packet 448. The conversion logic 449 may be operable to convert the upstream LLI transaction packet 448 to a corresponding upstream memory mapped transaction 450. The upstream memory mapped transaction 450 may be transmitted toward the master device processor 402.

The master device processor 402 may transmit a downstream PCIE configuration transaction 451 toward a PCIE configuration transaction to LLI service packet conversion logic 452 of the master device PCIE-LLI conversion logic. LLI currently does not support configuration transactions. In some embodiments, configuration transactions of PCIE may be mapped to LLI service packets which may be conveyed over the LLI link. The conversion logic 452 may be operable to convert the downstream PCIE configuration transaction 451 to a corresponding downstream LLI service packet 453. The downstream LLI service packet 453 may be transmitted toward the slave device PCIE-LLI conversion logic.

An LLI service packet to PCIE configuration transaction conversion logic 454 of the slave device PCIE-LLI conversion logic may receive the downstream LLI service packet 453. The conversion logic 454 may be operable to convert the downstream LLI service packet 453 to a corresponding downstream PCIE configuration transaction 455. The downstream PCIE configuration transaction 455 may be transmitted toward the slave device PCIE endpoint logic 425.

The slave device PCIE endpoint logic 425 may transmit an upstream message signaled interrupt 456 toward a message signaled interrupt to LLI service transaction conversion logic 457 of the slave device PCIE-LLI conversion logic. The conversion logic 457 may be operable to convert the upstream message signaled interrupt 456 to a corresponding upstream LLI service packet 458. The upstream LLI service packet 458 may be transmitted toward the master device PCIE-LLI conversion logic.

An LLI service transaction to message signaled interrupt conversion logic 459 of the master device PCIE-LLI conversion logic may receive the upstream LLI service transaction 458. The conversion logic 459 may be operable to convert the upstream LLI service transaction 458 to a corresponding upstream message signaled interrupt 460. The upstream message signaled interrupt 460 may be transmitted toward the master device processor 402.

To further illustrate how PCIE transactions may be converted to LLI transaction layer packets it may be helpful to consider a few illustrative examples. Memory-mapped reads and other memory-mapped transactions may not have data payloads. In such cases, most fields of the LLI packet (e.g., a 73-bit LLI command request packet) may be populated based on the corresponding fields of the PCIE transaction (e.g., a 48-bit PCIE request header format). For example, the address and length fields of the PCIE transaction may be mapped directly to the corresponding length and address fields of the LLI transaction layer packet. Other fields, such as the Requester ID, Tag, and BE fields, may be statically set. Others fields, such as memory attributes, may be sent as part of the ser fields. Now let's consider memory-mapped writes or other memory-mapped transactions that have data payloads. The PCIE write request transaction may be converted to an LLI command request packet as described immediately above. Additionally, each 64-bits of the PCIE data payload may be converted to an LLI write data request packet. A similar approach may be used for read responses. Now let's consider PCIE configuration transactions. A PCIE configuration transaction (e.g., a 48-bit PCIE configuration request transaction) may be converted to an LLI service packet (e.g., a 73-bit LLI service write address request packet). Certain fields, such as Requester ID, Tag, Bus/Dev/Fn number fields, may be statically set. The register number may be sent as part of the address. Other fields, if needed, may be sent as part of unused address field.

Figure 5:
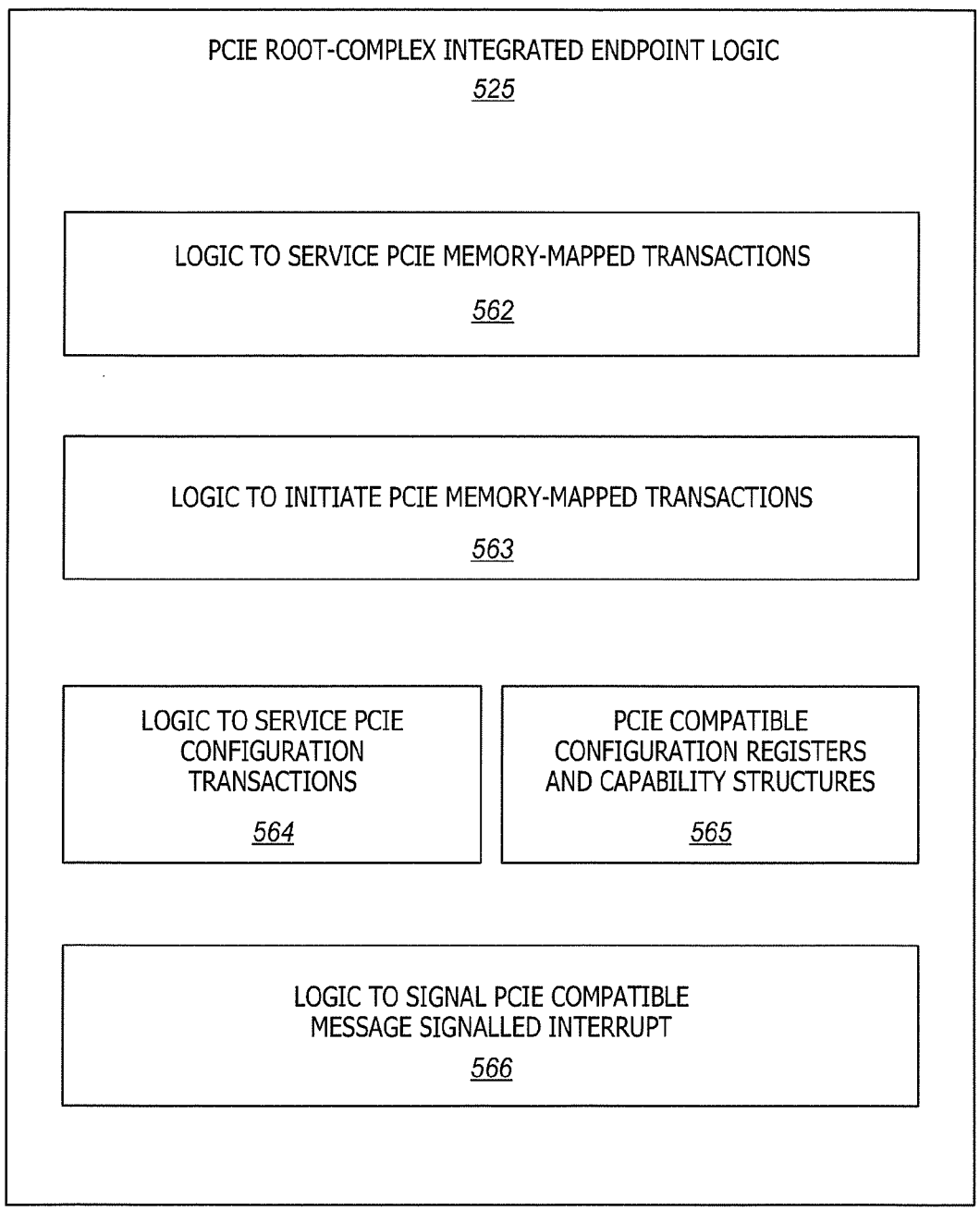
FIG. 5 is a block diagram of an embodiment of PCIE root-complex integrated endpoint logic.

FIG. 5 is a block diagram of an embodiment of PCIE root-complex integrated endpoint logic 525. In some embodiments, the endpoint logic 525 of FIG. 5 may be included in the LLI slave device 120 of FIG. 1. Alternatively, the endpoint logic 525 may be included in a similar or entirely different LLI slave device than that of FIG. 1. Moreover, the LLI slave device of FIG. 1 may include either the same, similar, or entirely different endpoint logic than that of FIG. 5.

The endpoint logic includes logic to service PCIE memory-mapped transactions 562, and logic to initiate PCIE memory-mapped transactions 563. The endpoint logic also includes logic to service PCIE configuration transactions 564, and PCIE compatible configuration registers and capability structures 565. The endpoint logic also includes logic to signal PCIE compatible message signaled interrupts 566. In some embodiments, each of these logic may be similar to, substantially the same as, or the same as, logic in a conventional PCIE root-complex integrated endpoint logic. In some embodiments, the LLI slave device in which the endpoint logic is included may not have a PCIE bus and/or the endpoint logic may not be coupled or in communication with the PCIE bus even if there is one.

Figure 6:
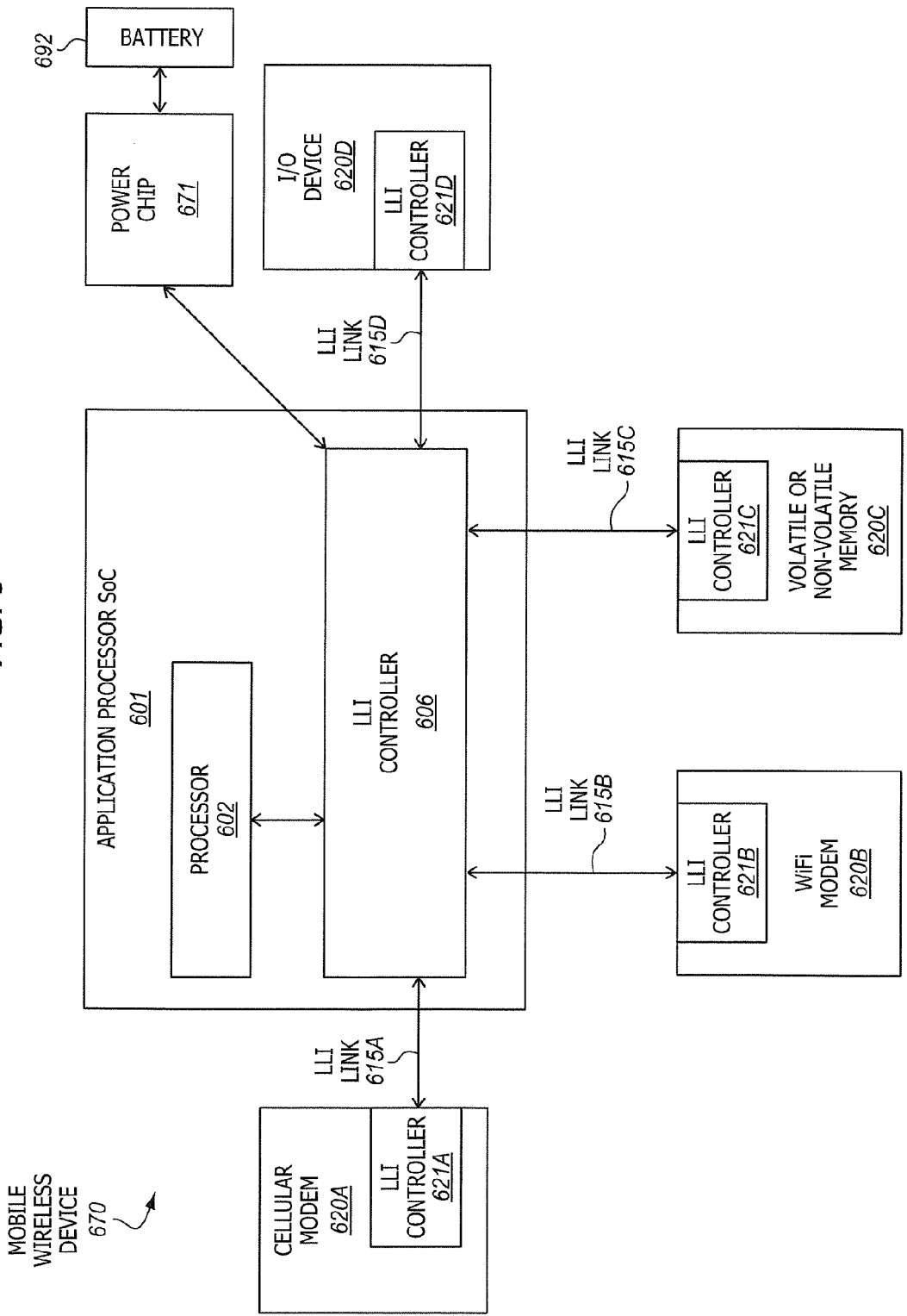
FIG. 6 is a block diagram of an embodiment of a mobile wireless device in which embodiments of the invention may be incorporated.

FIG. 6 is a block diagram of an embodiment of a mobile wireless device 670 in which embodiments of the invention may be incorporated. In various embodiments, the mobile wireless device may include a laptop, tablet, smartphone, cellular phone, digital audio player, or other mobile wireless device known in the arts. In some embodiments, the LLI master and/or slave devices of FIG. 1 may be included in the mobile wireless device of FIG. 6. Alternatively, the LLI master and/or slave devices of FIG. 1 may be included in a similar or entirely different device than that of FIG. 6. Moreover, the device of FIG. 6 may include either the same, similar, or entirely different LLI master and/or slave devices than those of FIG. 1.

The mobile wireless device includes an application processor system on chip (SoC) 601. The SoC has a processor 602 and an LLC controller 606. The SoC may incorporate an embodiment of conversion logic as disclosed elsewhere herein. A cellular modem 620A including an antenna has an LLI controller 621A that is coupled with the LLC controller 606 by an LLI link 615A. A WiFi modem 620B including an antenna has an LLI controller 621B that is coupled with the LLC controller 606 by an LLI link 615B. Dipole antennas are used in some, but not all, wireless devices. A volatile or non-volatile memory 620C has an LLI controller 621C that is coupled with the LLC controller 606 by an LLI link 615C.

One example of volatile memory included in some but not all devices is dynamic random access memory (DRAM). One example of non-volatile memory included in some but not all devices is flash memory. An input/output (I/O) device 620D has an LLI controller 621D that is coupled with the LLC controller 606 by an LLI link 615D. A few examples of suitable I/O devices include, but are not limited to, speaker or other audio output devices, keypad output, display device output, touchscreen input, vibrator output, and the like. Any of the cellular modem, the WiFi modem, the volatile or non-volatile memory, or the I/O device may incorporate embodiments of the conversion logic and endpoint logic disclosed elsewhere herein. The mobile wireless device also includes a power chip 671 that is coupled with the SoC 601. The power chip is coupled with a battery 672 that is operable to power the mobile wireless device.

Figure 7:
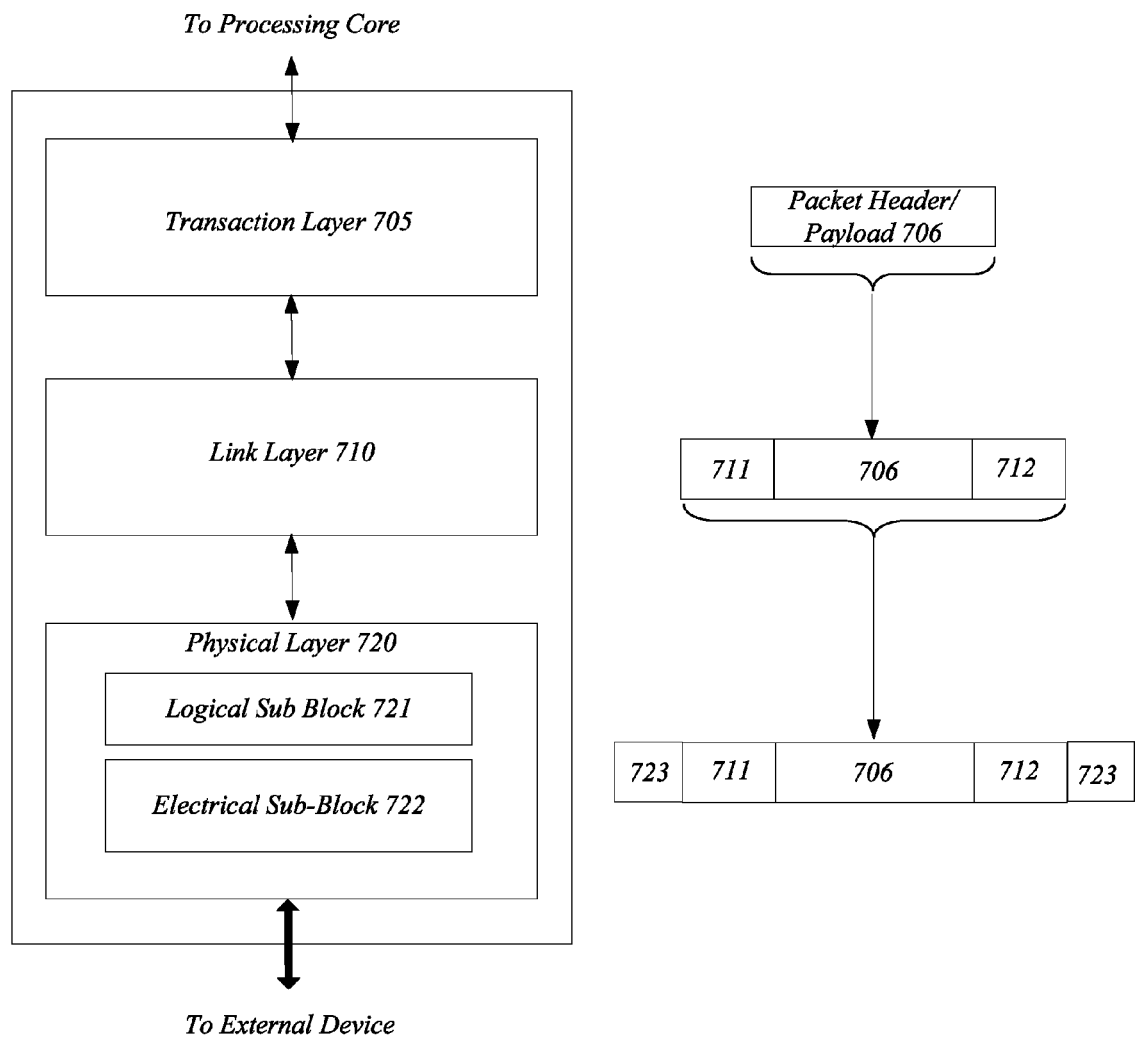
FIG. 7 illustrates an embodiment of a PCIe compliant interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCie stack, a next generation high performance computing interconnect stack, or other layered stack. In one embodiment, protocol stack 700 is a PCIe protocol stack including transaction layer 705, link layer 710, and physical layer 720. An interface may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
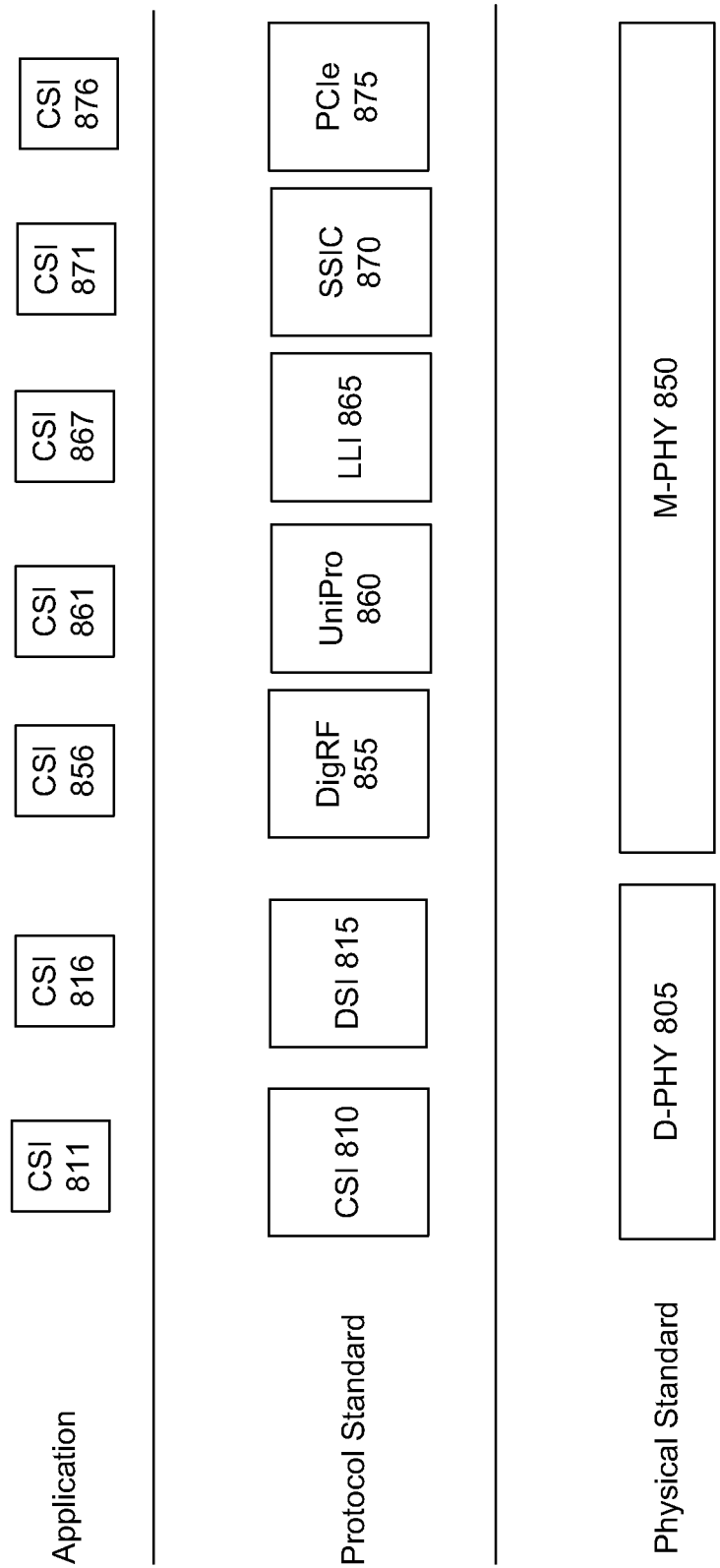
FIG. 8 illustrates an embodiment of different protocols to be transmitted over different physical layers of an interconnect architecture.

FIG. 8 illustrates an embodiment of an exemplary protocol stack for one or more of the interfaces discussed herein. For example, an interconnect may include a physical layer (PHY) to provide electrical/physical communication, while higher-level layers, such as a protocol, transaction, application, or link layer, may provide additional communication functionality. Here, MPHY 850 is capable of being implemented with a plurality of different protocol layers, such as DigRF 855, UniPro 860, LLI 865, SSIC 870 (i.e. USB 3 protocols), or PCIe 875 (i.e. Mobile Express). The physical layer also includes D-PHY 805. The protocol layer also includes CSI 810 and DSI 815. The application layer also includes CSI 811, CSI 816, CSI 856, CSI 861, CSI 867, CSI 871, and CSI 876.

Figure 9:
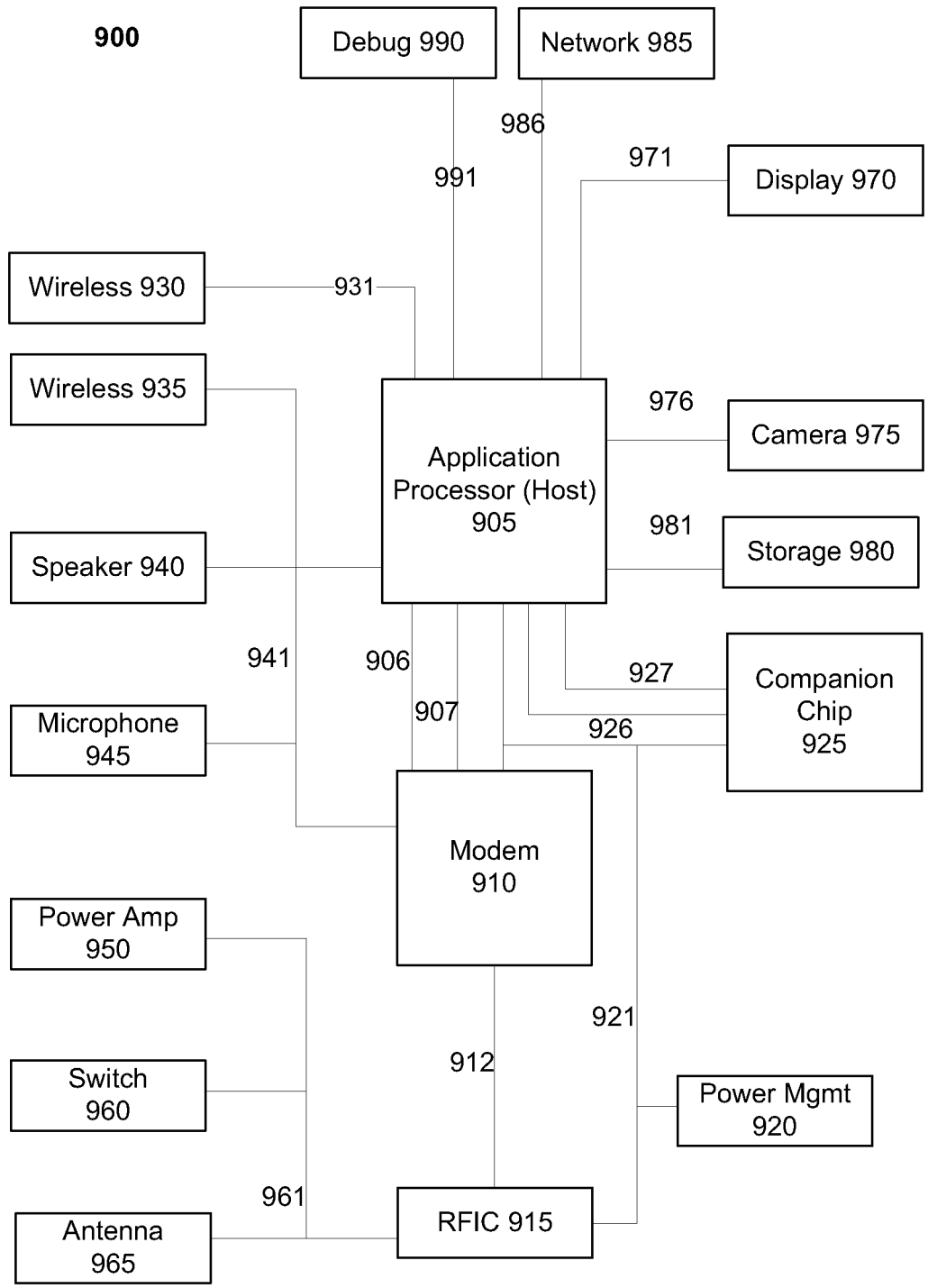
FIG. 9 illustrates an embodiment of a low power computing platform.

Referring to FIG. 9, an embodiment of a low power computing platform is depicted. In one embodiment, low power computing platform 900 includes a user equipment (UE). A UE refers to, in some embodiments, a device that may be used to communicate, such as a device with voice communication capability. Examples of a UE include a phone, smartphone, tablet, ultraportable notebook, and a low power notebook. However, a low power computing platform may also refer to any other platform to obtain a lower power operating point, such as a tablet, low power notebook, an ultraportable or ultrathin notebook, a micro-server server, a low power desktop, a transmitting device, a receiving device, or any other known or available computing platform. The illustrated platform depicts a number of different interconnects to couple multiple different devices. Exemplary discussion of these interconnect are provided below to provide options on implementation and inclusion of apparatus' and methods disclosed herein. However, a low power platform 900 is not required to include or implement the depicted interconnects or devices. Furthermore, other devices and interconnect structures that are not specifically shown may be included.

Starting at the center of the diagram, platform 900 includes application processor 905. Often this includes a low power processor, which may be a version of a processor configuration described herein or known in the industry. As one example, processor 900 is implemented as a system on a chip (SoC). As a specific illustrative example, processor 900 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note as the processor and SoC technologies from these companies advance, more components illustrated as separate from host processor 900 may be integrated on a SoC. As a result, similar interconnects (and inventions therein) may be used "on-die."

In one embodiment, application processor 905 runs an operating system, user interface and applications. Here, application processor 905 often recognizes or is associated with an Instruction Set Architecture (ISA) that the operating system, user interface, and applications utilize to direct processor 905's operation/execution. It also typically interfaces to sensors, cameras, displays, microphones and mass storage. Some implementations offload time critical telecom-related processing to other components.

As depicted, host processor 905 is coupled to a wireless interface 930, such as WLAN, WiGig, WirelessHD, or other wireless interface. Here an LLI, SSIC, or UniPort compliant interconnect is utilized to couple host processor 905 and wireless interface 930.

LLI stands for low latency interface. LLI typically enables memory sharing between two devices. A bidirectional interface transports memory transactions between two devices and allows a device to access the local memory of another device; often this is done without software intervention, as if it was a single device. LLI, in one embodiment, allows three classes of traffic, carrying signals over the link, reducing GPIO count. As an example, LLI defines a layered protocol stack for communication or a physical layer (PHY), such as an MPHY that is described in more detail below.

SSIC refers to SuperSpeed Inter-Chip. SSIC may enable the design of high speed USB devices using a low power physical layer. As an example, a MPHY layer is utilized, while USB 3.0 compliant protocols and software are utilized over the MPHY for better power performance.

UniPro describes a layered protocol stack with physical layer abstraction, providing a general purpose, error-handling, high speed solution for interconnecting a broad range of devices and components: application processors, co-processors, modems, and peripherals, as well as supporting different types of data traffic including control messages, bulk data transfer and packetized streaming. UniPro may support usage of an MPHY or DPHY.

Other interfaces may also couple directly to host processor 905, such as debug 990, Network 985, Display 970, camera 975, and storage 980 through other interfaces that may utilize the apparatus and methods described herein.

Debug interface 990 and network 985 communicates with application processor 905 through a debug interface 991, e.g. PTI, or network connection, e.g. a debug interface that operates over a functional network connection 985.

Display 970 includes one or more displays. In one embodiment, display 970 includes a display with one or more touch sensors capable of receiving/sensing touch input. Here, display 970 is coupled to application processor 905 through display interface (DSI) 971. DSI 971 defines protocols between host processor and peripheral devices, which may utilize a D-PHY physical interface. It typically adopts pixel formats and a defined command set for video formats and signaling, such as Display Pixel Interface 2 (DPI-2), and control display module parameters, such as through a Display Command Set (DCS). As an example, DSI 971 operates at approximately 1.5 Gb/s per lane or to 6 Gb/s.

Camera 975, in one embodiment, includes an image sensor used for still pictures, video capture, or both. Front and back side cameras are common on mobile devices. Dual-cameras may be used to provide stereoscopic support. As depicted, cameral 975 is coupled to application processor 905 through a peripheral interconnect, such as CSI 976. CSI 976 defines an interface between a peripheral device (e.g. camera, Image Signal Processor) and a host processor (e.g. 905, baseband, application engine). In one embodiment, image data transfers are performed over a DPHY, a unidirectional differential serial interface with data and clock signals. Control of the peripheral, in on embodiment, occurs over a separate back channel, such as camera control. As an illustrative example, the speed of CSI may range from 50 Mbps-2 Gbps, or any range/value therein.

Storage 980, in one example, includes a non-volatile memory used by the application processor 905 to store large amounts of information. It may be based on Flash technology or a magnetic type of storage, such as a hard-disk. Here, 980 is coupled to processor 905 through Universal Flash Storage (UFS) interconnect 981. UFS 981, in one embodiment, includes an interconnect that is tailored for low power computing platforms, such as mobile systems. As an example, it provides between 200 and 500 MB/s transfer rate (e.g. 300 MB/s) utilizing queuing features to increase random read/write speeds. In one implementations, UFS 981 uses the MPHY physical layer and a protocol layer, such as UniPro.

Modem 910 often stands for Modulator/demodulator. The modem 910 typically provides the interface to the cellular network. It's capable of communicating with different networks types and different frequencies, depending on which communication standard is used. In one embodiment, both voice and data connections are supported. Modem 910 is coupled to host 905 utilizing any known interconnect, such as one or more of LLI, SSIC, UniPro, Mobile Express, etc.

In one embodiment, a control bus is utilized to couple control or data interfaces, such as wireless 935, speaker 940, microphone 945. An example of such a bus is SLIMbus; a flexible low-power multi-drop interface capable of supporting a wide range of audio and control solutions. Other examples include PCM, I2S, I2C, SPI, and UART. Wireless 935 includes an interface, such as a short range communication standard between two devices (e.g. Bluetooth or NFC), a navigation system capable of triangulating position and/or time (e.g. GPS), a receiver for analog or radio broadcasts (e.g., FM Radio), or other known wireless interface or standard. Speaker(s) 940 includes any device to generate sound, such as an electromechanical device to generate ringtones or music. Multiple speakers may be used for stereo or multichannel sound. Microphone 945 is often utilized for voice input, such as talking during a call.

Radio Frequency Integrated Circuit (RFIC) 915 is to perform analog processing, such as processing of radio signals, e.g. amplification, mixing, filtering, and digital conversion. As depicted, RFIC 915 is coupled to modem 910 through interface 912. In one embodiment, interface 912 includes a bi-directional, high-speed interface (e.g. DigRF) that supports communication standards, such as LTE, 3GPP, EGPRS, UMTS, HSPA+, and TD-SCDMA. As a specific example, DigRF utilizes a frame-oriented protocol based on a M-PHY physical layer. DigRF is typically referred to as RF friendly, low latency, low power with optimized pin count that currently operations between 1.5 or 3 Gbps per lane and is configurable with multiple lanes, such as 4 lanes.

Interface 961 (e.g. a RF control interface) includes a flexible bus to support simple to complex devices. As a specific example, interface 961 includes a flexible two-wire serial bus, designed for control of RF Front-End components. One bus master may write and read to multiple devices, such as power amplifier 950 to amplify the RF signal, sensors to receive sensor input, switch module(s) 960 to switch between RF signal paths depending on a network mode, and antenna tuners 965 to compensate for bad antenna conditions or enhancing bandwidth. Interface 961, in one embodiment, has a group trigger function for timing-critical events and low EMI.

Power management 920 is used to provide all the different components in the mobile device 900 with power managed voltage, such as decreasing voltage or increasing it to improve efficiency for components in the mobile device. In one embodiment, it also controls and monitors the charge of the battery and remaining energy. A battery interface may be utilized between power management 920 and the battery. As an illustrative example, the battery interface includes a single-wire communication between a mobile terminal and smart/low cost batteries.

Figure 10:
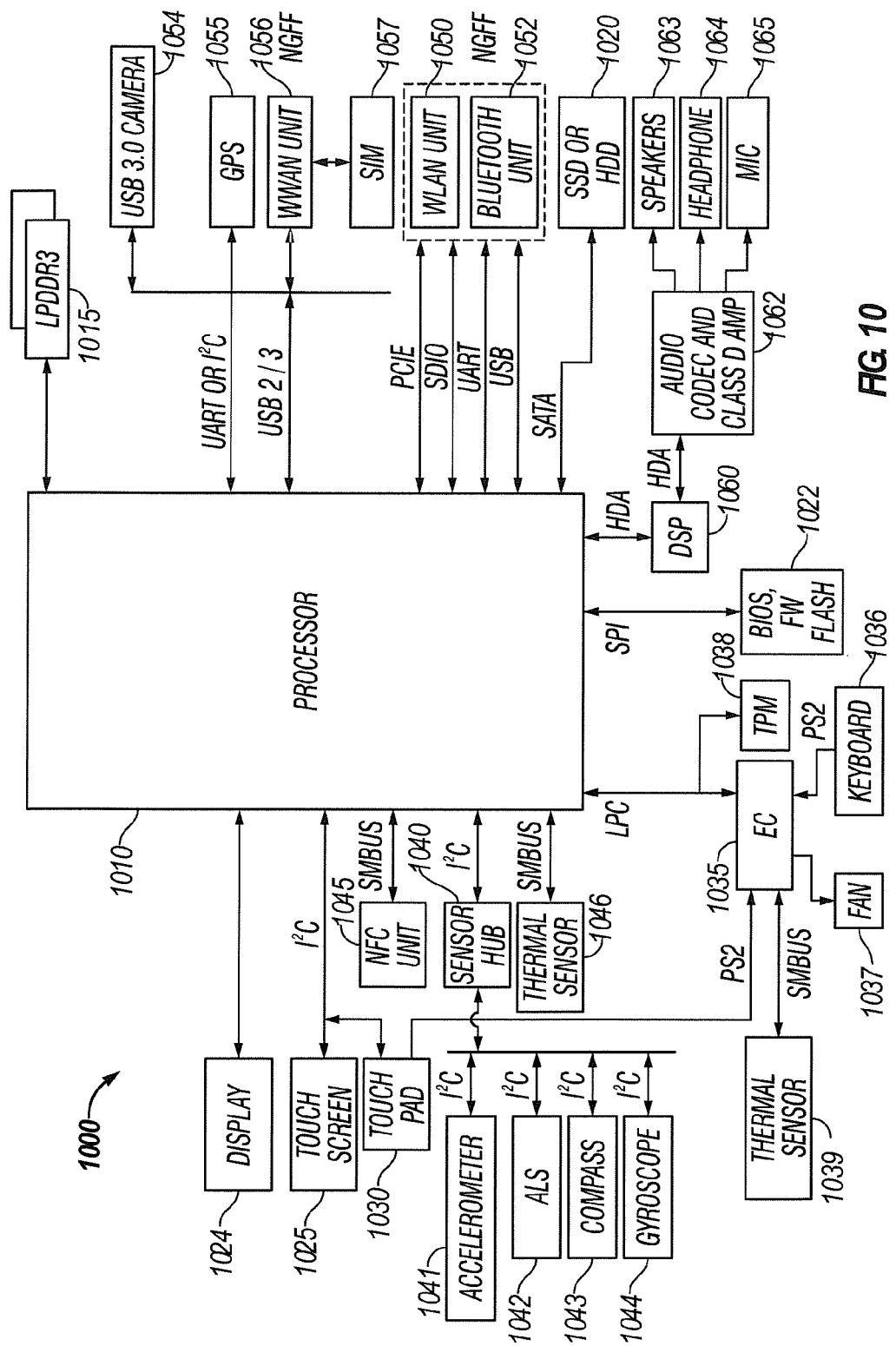
FIG. 10 illustrates an embodiment of a block diagram for a computing system

Referring now to FIG. 10, a block diagram of components present in a computer system in accordance with an embodiment of the present invention is illustrated. As shown in FIG. 10, system 1000 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 10 is intended to show a high level view of many components of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

As seen in FIG. 10, a processor 1010, in one embodiment, includes a microprocessor, multi-core processor, multi-threaded processor, an ultra low voltage processor, an embedded processor, or other known processing element. In the illustrated implementation, processor 1010 acts as a main processing unit and central hub for communication with many of the various components of the system 1000. As one example, processor 1000 is implemented as a system on a chip (SoC). As a specific illustrative example, processor 1010 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1010 in one implementation will be discussed further below to provide an illustrative example.

Processor 1010, in one embodiment, communicates with a system memory 1015. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, Mini-DIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1020 may also couple to processor 1010. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 10, a flash device 1022 may be coupled to processor 1010, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in an mSATA or NGFF slot. As an example, an SSD has a capacity ranging from 120 GB-1 TB.

Various input/output (IO) devices may be present within system 1000. Specifically shown in the embodiment of FIG. 10 is a display 1024 which may be a high definition LCD or LED panel configured within a lid portion of the chassis. This display panel may also provide for a touch screen 1025, e.g., adapted externally over the display panel such that via a user's interaction with this touch screen, user inputs can be provided to the system to enable desired operations, e.g., with regard to the display of information, accessing of information and so forth. In one embodiment, display 1024 may be coupled to processor 1010 via a display interconnect that can be implemented as a high performance graphics interconnect. Touch screen 1025 may be coupled to processor 1010 via another interconnect, which in an embodiment can be an I2C interconnect. As further shown in FIG. 10, in addition to touch screen 1025, user input by way of touch can also occur via a touch pad 1030 which may be configured within the chassis and may also be coupled to the same I2C interconnect as touch screen 1025.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080 p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1010 in different manners. Certain inertial and environmental sensors may couple to processor 1010 through a sensor hub 1040, e.g., via an I2C interconnect. In the embodiment shown in FIG. 10, these sensors may include an accelerometer 1041, an ambient light sensor (ALS) 1042, a compass 1043 and a gyroscope 1044. Other environmental sensors may include one or more thermal sensors 1046 which in some embodiments couple to processor 1010 via a system management bus (SMBus) bus.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 10, various peripheral devices may couple to processor 1010 via a low pin count (LPC) interconnect. In the embodiment shown, various components can be coupled through an embedded controller 1035. Such components can include a keyboard 1036 (e.g., coupled via a PS2 interface), a fan 1037, and a thermal sensor 1039. In some embodiments, touch pad 1030 may also couple to EC 1035 via a PS2 interface. In addition, a security processor such as a trusted platform module (TPM) 1038 in accordance with the Trusted Computing Group (TCG) TPM Specification Version 1.2, dated Oct. 2, 2003, may also couple to processor 1010 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1000 can communicate with external devices in a variety of manners, including wirelessly. In the embodiment shown in FIG. 10, various wireless modules, each of which can correspond to a radio configured for a particular wireless communication protocol, are present. One manner for wireless communication in a short range such as a near field may be via a near field communication (NFC) unit 1045 which may communicate, in one embodiment with processor 1010 via a SMBus. Note that via this NFC unit 1045, devices in close proximity to each other can communicate. For example, a user can enable system 1000 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 10, additional wireless units can include other short range wireless engines including a WLAN unit 1050 and a Bluetooth unit 1052. Using WLAN unit 1050, Wi-Fi™ communications in accordance with a given Institute of Electrical and Electronics Engineers (IEEE) 802.11 standard can be realized, while via Bluetooth unit 1052, short range communications via a Bluetooth protocol can occur. These units may communicate with processor 1010 via, e.g., a USB link or a universal asynchronous receiver transmitter (UART) link. Or these units may couple to processor 1010 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1056 which in turn may couple to a subscriber identity module (SIM) 1057. In addition, to enable receipt and use of location information, a GPS module 1055 may also be present. Note that in the embodiment shown in FIG. 10, WWAN unit 1056 and an integrated capture device such as a camera module 1054 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

To provide for audio inputs and outputs, an audio processor can be implemented via a digital signal processor (DSP) 1060, which may couple to processor 1010 via a high definition audio (HDA) link. Similarly, DSP 1060 may communicate with an integrated coder/decoder (CODEC) and amplifier 1062 that in turn may couple to output speakers 1063 which may be implemented within the chassis. Similarly, amplifier and CODEC 1062 can be coupled to receive audio inputs from a microphone 1065 which in an embodiment can be implemented via dual array microphones (such as a digital microphone array) to provide for high quality audio inputs to enable voice-activated control of various operations within the system. Note also that audio outputs can be provided from amplifier/CODEC 1062 to a headphone jack 1064. Although shown with these particular components in the embodiment of FIG. 10, understand the scope of the present invention is not limited in this regard.

In some embodiments, processor 1010 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1035. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1035 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 10, understand the scope of the present invention is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Components, features, and details described for any of FIGS. 4 and 5 may also optionally be used in any of FIG. 1, 2, or 3. Moreover, components, features, and details described herein for any of the apparatus may also optionally be used in any of the methods described herein, which in embodiments may be performed by and/or with such the apparatus.

The following examples pertain to further embodiments. Specifics in the examples may be used anywhere in one or more embodiments.

Example 1 is an interconnect architecture device that includes a processor to generate a transaction that is not compliant with (or alternatively is of a different interconnect protocol than) LLI. The device also includes conversion logic coupled with the processor, the conversion logic to convert the transaction, which is not compliant with (or alternatively is of the different interconnect protocol than) LLI, to an LLI packet. The device also includes an LLI controller coupled with the conversion logic, the LLI controller to couple the interconnect architecture device with an LLI link, the LLI controller to transmit a symbol corresponding to the LLI packet on the LLI link.

Example 2 includes the subject matter of Example 1 optionally in which the conversion logic comprises logic to convert the transaction selected from a Peripheral Component Interconnect (PCI) transaction, a Peripheral Component Interconnect Express (PCIE) transaction, and a Peripheral Component Interconnect eXtended (PCI-X) transaction to the LLI packet.

Example 3 includes the subject matter of Example 1 optionally in which the transaction is to be used for at least one of enumeration and configuration of an interconnect architecture device that is to be coupled with the LLI link.

Example 4 includes the subject matter of Example 1 optionally in which the transaction is selected from a PCI configuration transaction and a PCIE configuration transaction, and in which the conversion logic is to convert the configuration transaction to an LLI service packet.

Example 5 includes the subject matter of Example 1 optionally in which the transaction is selected from a PCI memory-mapped transaction and a PCIE memory-mapped transaction, and in which the conversion logic is to convert the memory-mapped transaction to an LLI transaction packet.

Example 6 includes the subject matter of Example 1 optionally in which the conversion logic is to provide the LLI packet to a transaction layer of an LLI stack of the LLI controller.

Example 7 includes the subject matter of any of Examples 1-6 optionally including a memory coupled with the processor, a module stored in the memory. The module is selected from an enumeration module and a configuration module. The module is compliant with the transaction (or alternatively of the interconnect protocol that is different from the LLI). The processor is to generate the transaction in response to executing one or more instructions of the module.

Example 8 includes the subject matter of any of Examples 1-6 optionally in which the interconnect architecture device does not have an interconnect conforming to an interconnect protocol that complies with the transaction (or alternatively is of the different interconnect protocol than LLI).

Example 9 is an interconnect architecture device that includes an LLI controller, the LLI controller to couple the interconnect architecture device with an LLI link, the LLI controller to receive a symbol on the LLI link. The device also includes conversion logic coupled with the LLI controller, the conversion logic to convert an LLI packet corresponding to the received symbol to a transaction that is not compliant with LLI (or alternatively that is of a different interconnect protocol than LLI). The device also includes logic of an interconnect protocol that is compliant with the transaction (or alternatively that is of the different interconnect protocol than LLI) coupled with the conversion logic to service the transaction.

Example 10 includes the subject matter of Example 9 optionally in which the conversion logic comprises logic to convert the LLI packet to a transaction selected from a PCI transaction, a PCIE transaction, and a PCI-X transaction.

Example 11 includes the subject matter of Example 9 optionally in which the logic that is that is compliant with the transaction (or alternatively that is of the interconnect protocol that is different than LLI) comprises one of PCI endpoint logic and PCIE endpoint logic.

Example 12 includes the subject matter of Example 9 optionally in which the logic that is compliant with the transaction (or alternatively that is of the interconnect protocol that is different than LLI) comprises root-complex integrated endpoint logic.

Example 13 includes the subject matter of Example 9 optionally in which the transaction is to be used to at least one of configure the interconnect architecture device and enumerate the interconnect architecture device to an interconnect architecture device that is to be coupled with the LLI link.

Example 14 includes the subject matter of Example 9 optionally in which the LLI packet comprises an LLI service packet, and in which the conversion logic is to convert the LLI service packet to one of a PCI configuration transaction and a PCIE configuration transaction.

Example 15 includes the subject matter of Example 9 optionally in which the LLI packet comprises an LLI transaction packet, and in which the conversion logic is to convert the LLI transaction packet to one of a PCI memory-mapped transaction and a PCIE memory-mapped transaction Example 16 includes the subject matter of any of Examples 9-15 optionally in which the conversion logic is to receive the LLI packet from a transaction layer of an LLI stack of the LLI controller, and in which the logic that is compliant with the transaction (or alternatively that is of the interconnect protocol that is different than LLI) is not coupled with an interconnect that uses the interconnect protocol.

Example 17 is a method in an interconnect architecture device that includes generating a transaction that is of a different interconnect protocol than LLI within the interconnect architecture device. The method also includes converting the transaction, which is of the different interconnect protocol than the LLI, to an LLI packet. The method further includes transmitting a symbol corresponding to the LLI packet on an LLI link.

Example 18 includes the subject matter of Example 17 optionally in which converting comprises converting one of a PCI transaction, a PCIE transaction, and a PCI-X transaction to the LLI packet.

Example 19 includes the subject matter of any of Examples 17-18 optionally in which generating comprises generating the transaction as part of at least one of enumeration and configuration of an interconnect architecture device coupled with the LLI link.

Example 20 is a method in an interconnect architecture device that includes receiving a symbol on an LLI link of the interconnect architecture device. The method also includes converting an LLI packet derived from the received symbol to a transaction that is of a different interconnect protocol than LLI. The method also includes servicing the transaction that is of the different interconnect protocol than the LLI.

Example 21 includes the subject matter of Example 20 optionally in which converting comprises converting the LLI packet to a transaction of a PCI based protocol, and in which servicing comprises servicing the transaction with an endpoint logic of a PCI based protocol.

Example 22 includes the subject matter of any of Examples 20-21 optionally including at least one of configuring the interconnect architecture device and enumerating the interconnect architecture device to an interconnect architecture device based on the servicing of the transaction.

Example 23 a system including a battery, a dipole antenna, a memory to store a PCI based protocol module, an LLI link, and an interconnect architecture device coupled with the LLI link. The interconnect architecture device includes conversion logic to convert LLI packets, which are to be received from an LLI stack that is to be coupled with the LLI link, to transactions of a PCI based protocol.

Example 24 includes the subject matter of Example 23 optionally in which the transactions of the PCI based protocol are to comprise at least one of transactions to enumerate the interconnect architecture device and transactions to configure the interconnect architecture device.

Example 25 includes the subject matter of any of Examples 23-24 optionally including PCI based logic coupled with the conversion logic to receive the transactions from the conversion logic. The PCI based logic is not coupled with either a PCI based protocol bus.

Example 26 includes an apparatus to perform memory mapped transactions comprising an integrated circuit. The integrated circuit includes a processing element to generate a memory mapped transaction that is to be compliant with a Peripheral Interconnect Component Express (PCIe) protocol standard. The integrated circuit includes conversion logic to convert the PCIe memory mapped transaction to a converted packet compliant with another protocol standard. The integrated circuit includes a mobile physical layer (MPHY) that is compliant with a MIPI standard to transmit the converted packet on a link.

Example 27 is an interconnect architecture device including means for generating a transaction that is of a different interconnect protocol than LLI. The device also includes conversion means, coupled with the means for generating, the conversion means for converting the transaction, which is of the different interconnect protocol than LLI, to an LLI packet. The device also includes transmit means, coupled with the conversion means, the transmit means to transmit a symbol corresponding to the LLI packet on an LLI link.

Example 28 is an interconnect architecture device including LLI link coupling means for coupling the interconnect architecture device with an LLI link and for receiving a symbol on the LLI link. The device also includes conversion means coupled with the LLI link coupling means, the conversion means for converting an LLI packet derived from the symbol to a transaction that is of a different interconnect protocol than LLI. The device also includes servicing means, which is of the interconnect protocol that is different than LLI, and which is coupled with the conversion means, for servicing the transaction.

Example 29 includes an apparatus to perform the method of any of claims 17-19.

Example 30 includes an apparatus comprising means for performing the method of any of claims 17-19.

Example 31 includes a system comprising a memory, a battery, and a wireless modem, the system to perform the method of any of claims 17-19.

Example 32 includes an apparatus to perform the method of any of claims 20-22.

Example 33 includes an apparatus comprising means for performing the method of any of claims 20-22.

Example 34 includes a system comprising a memory, a battery, and a wireless modem, the system to perform the method of any of claims 20-22.

Example 35 includes an apparatus to perform a method substantially as described herein.

Example 36 includes an apparatus comprising means for performing a method substantially as described herein.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, a processor may be coupled with a PCIE-LLI conversion module by an intervening interconnect and/or one or more other components. In the figures, arrows are used to show connections and couplings.

In the description and claims, the term "logic" may have been used. As used herein, logic may include hardware, firmware, software, or a combination thereof. Examples of logic include integrated circuitry, application specific integrated circuits, analog circuits, digital circuits, programmed logic devices, memory devices including instructions, etc. In some embodiments, the hardware logic may include transistors and/or gates potentially along with other circuitry components.

The term "and/or" may have been used. As used herein, the term "and/or" means one or the other or both (e.g., A and/or B means A or B or both A and B).

In the description above, for purposes of explanation, numerous specific details have been set forth in order to provide a thorough understanding of embodiments of the invention. It will be apparent however, to one skilled in the art, that one or more other embodiments may be practiced without some of these specific details. The particular embodiments described are not provided to limit the invention but to illustrate it through example embodiments. The scope of the invention is not to be determined by the specific examples but only by the claims. In other instances, well-known circuits, structures, devices, and operations have been shown in block diagram form or without detail in order to avoid obscuring the understanding of the description.

Where considered appropriate, reference numerals, or terminal portions of reference numerals, have been repeated among the figures to indicate corresponding or analogous elements, which may optionally have similar or the same characteristics, unless specified or clearly apparent otherwise. In some cases, where multiple components have been described, they may be incorporated into a single component. In other cases, where a single component has been described, it may be partitioned into multiple components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, one or more, or a sequence of instructions, that if and/or when executed by a machine causes the machine to perform and/or results in the machine performing one or operations, methods, or techniques disclosed herein. In some embodiments, the machine-readable medium may include a tangible and/or non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or the like. The tangible medium may include one or more solid or tangible physical data storage materials, such as, for example, a semiconductor material, a phase change material, a magnetic material, etc. The data storage medium does not consist of a transitory propagated signal such as carrier waves, infrared signals, digital signals, etc. In some embodiments, the storage medium is non-volatile.

Examples of suitable machines include, but are not limited to, desktops, laptops, notebooks, netbooks, tablets, smartphones, cellular phones, Mobile Internet devices (MIDs), mobile wireless devices, mobile terminals, battery-powered electronic devices, media players, and other computing or electronic devices having one or more processors. Such electronic devices typically include one or more processors coupled with one or more other components, such as one or more non-transitory machine-readable storage media, user input/output devices (e.g., a keyboard, a touchscreen, and/or a display). The coupling of the processors and other components is typically through one or more busses and bridges (also termed bus controllers).

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. An interconnect architecture device comprising:
a processor to generate a transaction that is not compliant with LLI;
conversion logic coupled with the processor, the conversion logic to convert the transaction, which is not compliant with LLI, to an LLI packet; and
an LLI controller coupled with the conversion logic, the LLI controller to couple the interconnect architecture device with an LLI link, the LLI controller to transmit a symbol corresponding to the LLI packet on the LLI link, wherein the transaction is selected from a PCI configuration transaction and a PCIE configuration transaction, and wherein the conversion logic is to convert the configuration transaction to an LLI service packet.

2. The device of claim 1, wherein the conversion logic comprises logic to convert the transaction selected from a Peripheral Component Interconnect (PCI) transaction, a Peripheral Component Interconnect Express (PCIE) transaction, and a Peripheral Component Interconnect extended (PCI-X) transaction to the LLI packet.

3. The device of claim 1, wherein the transaction is to be used for at least one of enumeration and configuration of a device that is to be coupled with the LLI link.

4. The device of claim 1, wherein the transaction is selected from a PCI memory-mapped transaction and a PCIE memory-mapped transaction, and wherein the conversion logic is to convert the memory-mapped transaction to an LLI transaction packet.

5. The device of claim 1, wherein the conversion logic is to provide the LLI packet to a transaction layer of an LLI stack of the LLI controller.

6. The device of claim 1, further comprising:
a memory coupled with the processor; and
a module stored in the memory, the module selected from an enumeration module and a configuration module, wherein the module is of an interconnect protocol that is different from the LLI, and
wherein the processor is to generate the transaction in response to executing one or more instructions of the module.

7. The device of claim 1, wherein the interconnect architecture device does not have an interconnect conforming to an interconnect protocol that the transaction is compliant with other than LLI.

8. An interconnect architecture device comprising:
an LLI controller, the LLI controller to couple the interconnect architecture device with an LLI link, the LLI controller to receive a symbol on the LLI link;
conversion logic coupled with the LLI controller, the conversion logic to convert an LLI packet corresponding to the received symbol to a transaction that is not compliant with LLI; and
logic of an interconnect protocol that is compliant with the transaction coupled with the conversion logic to service the transaction, wherein the logic that is of the interconnect protocol that is compliant with the transaction is not coupled with an interconnect that uses the interconnect protocol.

9. The device of claim 8, wherein the conversion logic comprises logic to convert the LLI packet to a transaction selected from a PCI transaction, a PCIE transaction, and a PCI-X transaction.

10. The device of claim 8, wherein the logic that is of the interconnect protocol that is compliant with the transaction comprises one of PCI endpoint logic and PCIE endpoint logic.

11. The device of claim 10, wherein the logic that is of the interconnect protocol that is compliant with the transaction comprises root-complex integrated endpoint logic.

12. The device of claim 8, wherein the transaction is to be used to at least one of configure the interconnect architecture device and enumerate the interconnect architecture device to an interconnect architecture device that is to be coupled with the LLI link.

13. The device of claim 8, wherein the LLI packet comprises an LLI service packet, and wherein the conversion logic is to convert the LLI service packet to one of a PCI configuration transaction and a PCIE configuration transaction.

14. The device of claim 8, wherein the LLI packet comprises an LLI transaction packet, and wherein the conversion logic is to convert the LLI transaction packet to one of a PCI memory-mapped transaction and a PCIE memory-mapped transaction.

15. An interconnect architecture device comprising:
   an LLI controller, the LLI controller to couple the interconnect architecture device with an LLI link, the LLI controller to receive a symbol on the LLI link;
   conversion logic coupled with the LLI controller, the conversion logic to convert an LLI packet corresponding to the received symbol to a transaction that is not compliant with LLI; and
   logic of an interconnect protocol that is compliant with the transaction coupled with the conversion logic to service the transaction, wherein the conversion logic is to receive the LLI packet from a transaction layer of an LLI stack of the LLI controller, and wherein the logic that is of the interconnect protocol that is compliant with the transaction is not coupled with an interconnect that uses the interconnect protocol.

16. A method in an interconnect architecture device comprising:
   generating a transaction that is of a different interconnect protocol than LLI within the interconnect architecture device;
   converting the transaction, which is of the different interconnect protocol than the LLI, to an LLI packet; and
   transmitting a symbol corresponding to the LLI packet on an LLI link, wherein the transaction is selected from a PCI configuration transaction and a PCIE configuration transaction, and wherein the conversion logic is to convert the configuration transaction to an LLI service packet.

17. The method of claim 16, wherein converting comprises converting one of a PCI transaction, a PCIE transaction, and a PCI-X transaction to the LLI packet.

18. The method of claim 16, wherein generating comprises generating the transaction as part of at least one of enumeration and configuration of an interconnect architecture device coupled with the LLI link.

19. A system comprising:
   a battery;
   a dipole antenna;
   a memory to store a PCI based protocol module;
   an LLI link;
   an interconnect architecture device comprising an LLI controller to couple the interconnect architecture device with the LLI link, the LLI controller to receive a symbol on the LLI link;
   conversion logic coupled with the LLI controller, the conversion logic to convert an LLI packet corresponding to the received symbol to a transaction that is not compliant with LLI; and
   logic of an interconnect protocol that is compliant with the transaction coupled with the conversion logic to service the transaction, wherein the logic that is of the interconnect protocol that is compliant with the transaction is not coupled with an interconnect that uses the interconnect protocol.

20. The system of claim 19, wherein the transactions of the PCI based protocol are to comprise at least one of transactions to enumerate the interconnect architecture device and transactions to configure the interconnect architecture device.

21. The system of claim 19, wherein the PCI based protocol comprises PCI.

22. The system of claim 19, wherein the PCI based protocol comprises PCIE.

* * * * *